United States Patent
Greenberg et al.

(10) Patent No.: US 11,401,868 B2
(45) Date of Patent: Aug. 2, 2022

(54) SYSTEM AND METHOD FOR CONTROLLING DUAL STARTER AIR VALVE

(71) Applicant: Raytheon Technologies Corporation, Farmington, CT (US)

(72) Inventors: Michael D Greenberg, Bloomfield, CT (US); Robert Goodman, West Hartford, CT (US); John M Dehais, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/021,714

(22) Filed: Sep. 15, 2020

(65) Prior Publication Data
US 2020/0408104 A1 Dec. 31, 2020

Related U.S. Application Data

(62) Division of application No. 15/344,982, filed on Nov. 7, 2016, now Pat. No. 10,934,885.

(51) Int. Cl.
*F02C 7/277* (2006.01)
*F01D 17/06* (2006.01)
(Continued)

(52) U.S. Cl.
CPC .............. *F02C 7/277* (2013.01); *F01D 17/06* (2013.01); *F01D 17/205* (2013.01); *F01D 17/24* (2013.01); *F01D 19/00* (2013.01); *F01D 19/02* (2013.01); *F01D 21/003* (2013.01); *F16K 1/12* (2013.01); *F16K 31/124* (2013.01);
(Continued)

(58) Field of Classification Search
CPC ........ F01D 17/02; F01D 17/06; F01D 17/205; F01D 19/00; F01D 19/02; F02C 7/277; F02C 7/27; F02C 7/32; F02N 2200/022; F05D 2260/85; F16K 1/12; F16K 31/124
See application file for complete search history.

(56) References Cited

U.S. PATENT DOCUMENTS

| | | |
|---|---|---|
| 2,986,881 A | 6/1961 | Moore |
| 4,702,273 A | 10/1987 | Allen, Jr. |

(Continued)

FOREIGN PATENT DOCUMENTS

EP 1617053 1/2006

OTHER PUBLICATIONS

European Patent Office, European Search Report dated April 5, 2018 in Application No. 17199557.4.
(Continued)

*Primary Examiner* — Alain Chau
(74) *Attorney, Agent, or Firm* — Snell & Wilmer L.L.P.

(57) ABSTRACT

A system may comprise a sensor configured to measure a characteristic of an engine component. A valve assembly may have an airflow outlet in fluid communication with the engine component. The valve assembly may include a first valve. A first valve control device may be coupled to the first valve and configured to control the first valve based on a measurement by the sensor. A second valve may be in fluidic series with the first valve. A second valve control device may be coupled to the second valve and configured to control the second valve based on the measurement by the sensor.

14 Claims, 6 Drawing Sheets

(51) Int. Cl.
*F01D 19/00* (2006.01)
*F01D 17/20* (2006.01)
*F01D 21/00* (2006.01)
*F01D 17/24* (2006.01)
*F16K 31/124* (2006.01)
*F16K 1/12* (2006.01)
*F01D 19/02* (2006.01)

(52) U.S. Cl.
CPC .... *F02N 2200/022* (2013.01); *F05D 2220/32* (2013.01); *F05D 2240/40* (2013.01); *F05D 2260/84* (2013.01); *F05D 2260/85* (2013.01); *F05D 2270/304* (2013.01); *F05D 2270/46* (2013.01)

(56) References Cited

U.S. PATENT DOCUMENTS

| | | | |
|---|---|---|---|
| 4,934,136 A | 6/1990 | Weigand | |
| 5,060,469 A | 10/1991 | Klaass | |
| 5,127,220 A * | 7/1992 | Jesrai | F02C 7/277 |
| | | | 60/778 |
| 5,235,812 A | 8/1993 | Klaass | |
| 5,237,815 A * | 8/1993 | McArthur | F02N 7/00 |
| | | | 60/627 |
| 5,315,817 A * | 5/1994 | Vannini | F02C 7/277 |
| | | | 60/788 |
| 5,435,125 A | 7/1995 | Telakowski | |
| 5,752,383 A * | 5/1998 | Rominek | F01D 21/006 |
| | | | 60/39.23 |
| 6,684,898 B2 | 2/2004 | Wiggins | |
| 7,246,482 B2 | 7/2007 | Mahoney | |
| 8,146,370 B2 | 4/2012 | Zeiner | |
| 8,742,605 B1 | 6/2014 | Wilhide | |
| 9,803,558 B2 * | 10/2017 | Villanueva | F02C 6/08 |
| 9,810,158 B2 | 11/2017 | Foutch | |
| 10,041,414 B2 | 8/2018 | Zaccaria | |
| 10,100,744 B2 | 10/2018 | Mackin | |
| 2003/0145603 A1 | 8/2003 | Reed | |
| 2006/0010875 A1 * | 1/2006 | Mahoney | F02C 3/13 |
| | | | 60/802 |
| 2009/0321667 A1 * | 12/2009 | McCollum | F16K 31/385 |
| | | | 251/61 |
| 2010/0085676 A1 * | 4/2010 | Wilfert | F02N 11/08 |
| | | | 361/170 |
| 2010/0326089 A1 | 12/2010 | Weber | |
| 2014/0373552 A1 * | 12/2014 | Zaccaria | F02C 7/277 |
| | | | 60/778 |
| 2014/0373554 A1 * | 12/2014 | Pech | F02C 7/277 |
| | | | 60/788 |
| 2015/0275769 A1 | 10/2015 | Foutch | |
| 2016/0167792 A1 | 6/2016 | Greenberg | |
| 2016/0237915 A1 | 8/2016 | Villanueva | |
| 2016/0368614 A1 | 12/2016 | Endres | |
| 2016/0369705 A1 | 12/2016 | Mackin | |
| 2017/0233103 A1 * | 8/2017 | Teicholz | F02C 7/27 |
| | | | 701/100 |
| 2017/0234233 A1 * | 8/2017 | Schwarz | F02K 3/04 |
| | | | 60/204 |
| 2018/0023413 A1 * | 1/2018 | Chowdhury | F01D 25/34 |
| | | | 60/778 |
| 2018/0023479 A1 * | 1/2018 | Clauson | F01D 21/02 |
| | | | 60/778 |
| 2018/0023484 A1 * | 1/2018 | Gelwan | B64D 27/10 |
| | | | 701/100 |
| 2018/0112600 A1 * | 4/2018 | Kelly | F02C 7/277 |

OTHER PUBLICATIONS

USPTO, Restriction/Election Requirement dated Nov. 27, 2018 in U.S. Appl. No. 15/344,982.
USPTO, Pre-Interview First Office Action dated Mar. 25, 2019 in U.S. Appl. No. 15/344,982.
USPTO, Final Office Action dated Jul. 19, 2019 in U.S. Appl. No. 15/344,982.
USPTO, Advisory Action dated Oct. 15, 2019 in U.S. Appl. No. 15/344,982.
USPTO, Non-Final Office Action dated Dec. 4, 2019 in U.S. Appl. No. 15/344,982.
USPTO, Notice of Allowance dated Jun. 8, 2020 in U.S. Appl. No. 15/344,982.
European Patent Office, European Office Action dated Jul. 2, 2020 in Application No. 17199557.4.

* cited by examiner

SYSTEM AND METHOD FOR CONTROLLING DUAL STARTER AIR VALVE

CROSS-REFERENCE TO RELATED APPLICATIONS

This application is a divisional of, and claims priority to, and the benefit of U.S. Non-Provisional application Ser. No. 15/344,982, entitled "SYSTEM AND METHOD FOR CONTROLLING DUAL Starter AIR Valve," filed on Nov. 7, 2016, which is hereby incorporated by reference in its entirety.

FIELD

The present disclosure relates to valve systems and, more specifically, to valve systems for gas turbine engines.

BACKGROUND

A gas turbine engine typically includes a fan section, a compressor section, a combustor section, and a turbine section. Air moves into the engine through the fan section. Airfoil arrays in the compressor section rotate to compress the air, which is then mixed with fuel and combusted in the combustor section. The products of combustion are expanded to rotatably drive airfoil arrays in the turbine section. Rotating the airfoil arrays in the turbine section drives rotation of the fan and compressor sections. The compressor section and turbine section each have multiple stages of blades that rotate about a central axis and multiple stages of vanes that are stationary relative to the central axis.

High efficiency gas turbine engines may undergo a thermal stabilization or cooling cycle prior to engine operation. Gas turbine engines, including turbofan engines, may utilize an air turbine starter for a cooling cycle and subsequent spool up to ignition. A traditional shutoff valve used to control airflow to the air turbine starter for the cooling cycle and spool up may experience rapid wear, which may lead to frequent maintenance and/or replacement of the valve.

SUMMARY

A valve assembly and a system for controlling for air turbine starter is described herein, in accordance with various embodiments. A system may comprise a sensor configured to measure a characteristic of an engine component. A valve assembly may have an airflow outlet in fluid communication with the engine component. The valve assembly may include a first valve. A first valve control device may be coupled to the first valve and configured to control the first valve based on a measurement by the sensor. A second valve may be in fluidic series with the first valve. A second valve control device may be coupled to the second valve and configured to control the second valve based on the measurement by the sensor.

In various embodiments, the first valve control device may comprise a torque motor servovalve. The torque motor servovalve may be configured to adjust a position of the first valve in response to an input of a current. The first valve may comprise a first piston. A position of the first piston may be configured to control an output pressure of air at the airflow outlet. The second valve control device may comprise a solenoid. The solenoid may be configured to open or close the second valve. The second valve may comprise a second piston. A position of the second piston may be configured to control an output pressure of air at the airflow outlet. The sensor may be configured to send the measurement to a full authority digital engine control (FADEC). The FADEC may be configured to receive the measurement from the sensor and to generate a command based on the measurement. At least one of the first valve control device or the second valve control device may be configured to receive the command from the FADEC.

A system for a gas turbine engine may comprise an air turbine starter. A valve assembly may have an airflow outlet in fluid communication with the air turbine starter. The valve assembly may include a first valve. A first valve control device may be coupled to the first valve and configured to control the first valve. A second valve may be in fluidic series with the first valve. A second valve control device may be coupled to the second valve and configured to control the second valve. A FADEC may be coupled to the valve assembly. A sensor may be configured to measure a rotational speed of the gas turbine engine. The system may include a tangible, non-transitory memory configured to communicate with the FADEC, the tangible, non-transitory memory having instructions stored thereon that, in response to execution by the FADEC, cause the FADEC to perform operations comprising receiving, by the FADEC, a rotational speed measurement from the sensor, and sending, by the FADEC, a command to at least one of the first valve control device or the second valve control device to control a pressure at the airflow outlet of the valve assembly. The command may be based on the rotational speed measurement.

In various embodiments, the first valve control device may comprise a torque motor servovalve. The torque motor servovalve may be configured to receive the command from the FADEC and to position the first valve. The second valve control device may comprise a solenoid. The solenoid may be configured to receive the command from the FADEC and to open or close the second valve. The first valve may comprise a first piston. A position of the first piston may be configured to control the pressure at the airflow outlet of the valve assembly. The second valve may comprise a second piston. A position of the second piston may be configured to control the pressure at the airflow outlet of the valve assembly. The first valve control device and the second valve control device may be in electrical communication with the FADEC. The first valve control device may comprise a first torque motor servovalve and the second valve control device may comprise a second torque motor servovalve.

A method of controlling a rotational speed of a gas turbine engine during start up is also provided. The method may comprise the steps of receiving by a valve assembly an input airflow having an input pressure. The valve assembly may include a first valve and a second valve. The method may further comprise measuring the rotational speed of the gas turbine engine, controlling, by a FADEC, an output pressure of an output airflow by controlling a position at least one of the first valve and the second valve based on the rotational speed of the gas turbine engine, and delivering the output airflow to an air turbine starter coupled to the gas turbine engine.

In various embodiments, the first valve may comprise a torque motor servovalve. The step of positioning at least one of the first valve and the second valve may further comprise delivering a current to the torque motor servovalve to adjust the position of the first valve. The step of positioning at least one of the first valve and the second valve may further comprise locking the second valve in an open position while adjusting the position of the first valve. The second valve may comprise a solenoid. The step of positioning at least one of the first valve and the second valve may further comprise pulse width modulating the solenoid between an on state and an off state. The positioning at least one of the first valve and the second valve may further comprise locking the first valve in an open position while pulse width modulating the solenoid. The method may further comprise decreasing the output pressure of the output airflow to reduce the rotational speed of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 1:
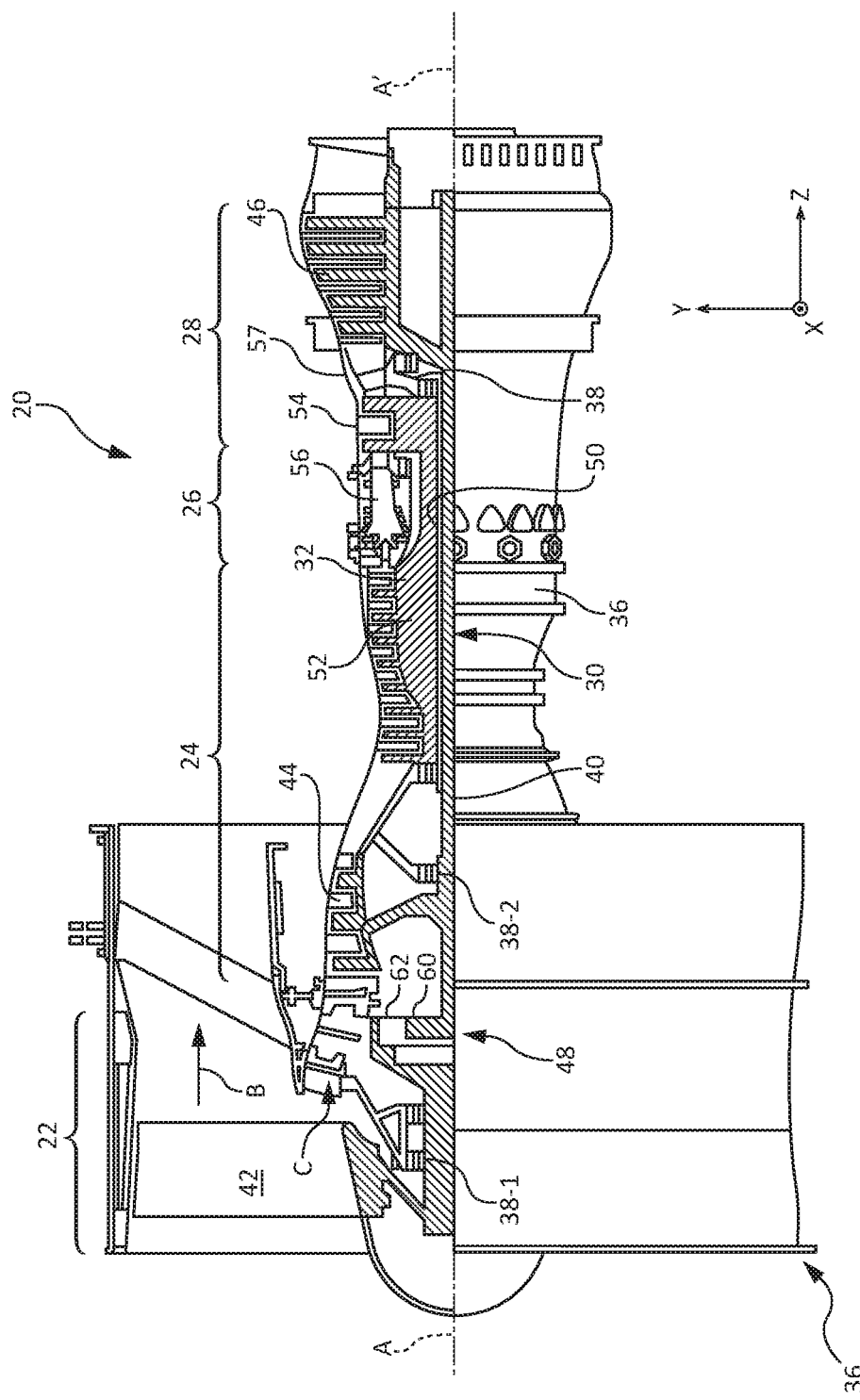
FIG. 1 illustrates a schematic cross-section of a gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Various components of gas turbine engine 20, including the rotor systems, may heat or cool at different rates following operation and shutdown, leading to unequal thermal expansion which may physically deform the engine components. Such thermal inequality may lead to bowed rotors which can cause deflection of the rotor systems. Starting the engine in this bowed condition can lead to tip strike of the rotor blades against nearby engine components, such as blade outer air seals (BOAS). Systems, as provided herein, may aid in more uniform cooling of gas turbine engine components during start-up and may reduce engine maintenance time of valves in the air turbine starter (ATS). A valve system may be configured to regulate airflow to the air turbine starter. By controlling airflow to the air turbine starter, the speed of the engine can be regulated to uniformly distribute engine temperature, thereby reducing the bowing of rotor systems, particularly during engine start-up.

Figure 2:
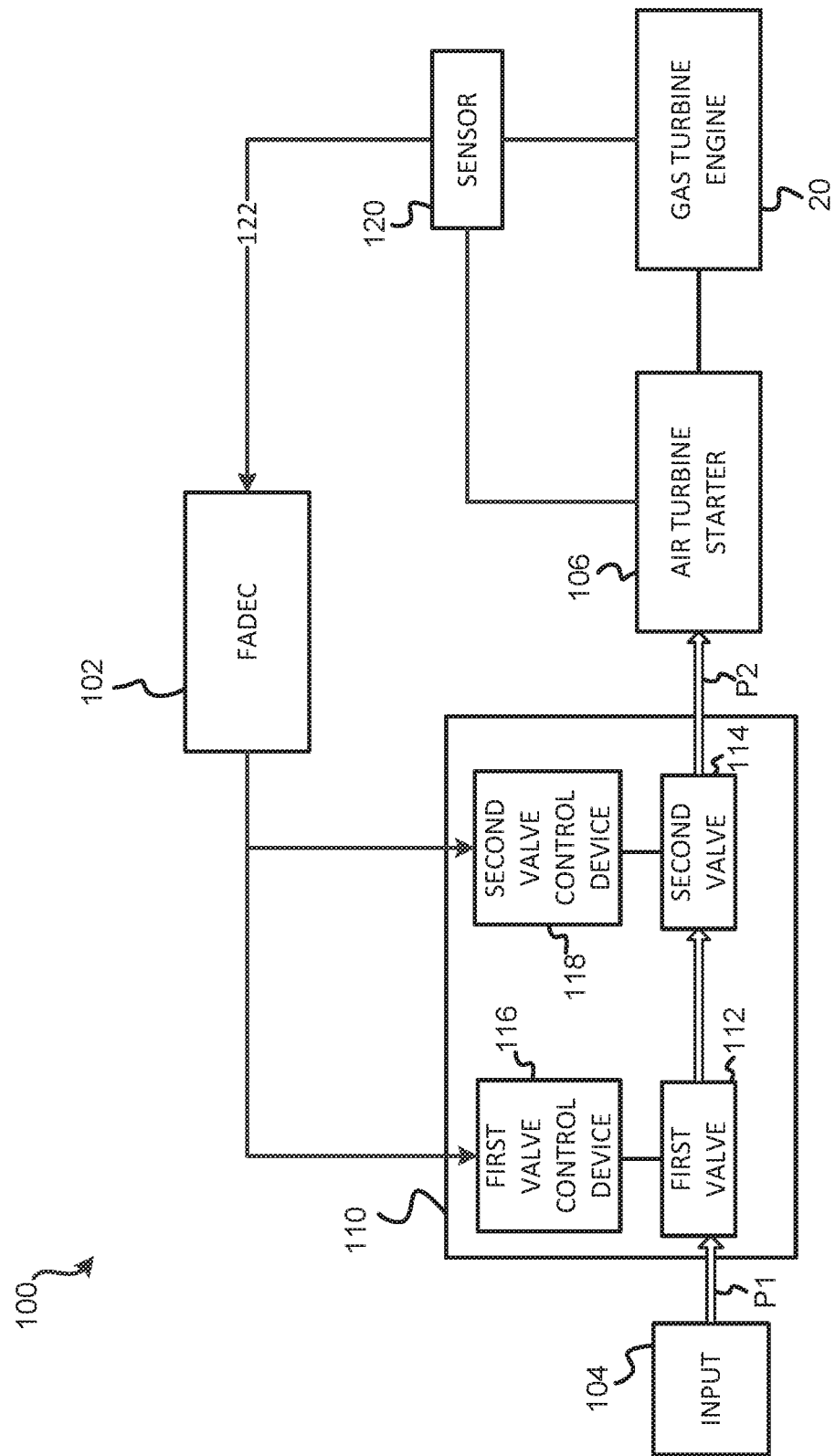
FIG. 2 illustrates a schematic block diagram of a system for rotating a gas turbine engine during a start-up cycle, in accordance with various embodiments.

With reference to FIG. 2, a system 100 for controlling a valve assembly and regulating airflow to an engine component is shown schematically, in accordance with various embodiments. System 100 may include a valve assembly 110 and a controller, such as a full authority digital engine control (FADEC) 102. FADEC 102 may be in electrical communication with a valve assembly 110 and configured to control one or more valve control devices of valve assembly 110. Valve assembly 110 may include a first valve 112 and a second valve 114 with each of first valve 112 and second valve 114 being controlled by a valve control device. A first valve control device 116 may be coupled to first valve 112 and configured to receive a command from FADEC 102 and to adjust or maintain a position of first valve 112. In various embodiments, first valve control device 116 may include, for example, a torque motor servovalve, a solenoid, or other electromagnetic, electromechanical, or electrohydraulic control scheme, such as motorized valve, for example, including an actuator or other servomechanism. A second valve control device 118 may be coupled to second valve 114 and configured to receive a command from FADEC 102 and to adjust or maintain a position of second valve 114. In various embodiments, second valve control device 118 may include, for example, a torque motor servovalve, a solenoid, or other electromagnetic, electromechanical, or electrohydraulic control scheme, such as motorized valve, for example, including an actuator or other servomechanism.

FADEC 102 may be configured to send a command to first valve control device 116 to control a position of first valve 112, and may further be configured to send a command to second valve control device 118 to control a position of second valve 114. By controlling a position of first valve 112 and second valve 114, an output pressure P2 of the airflow output of valve assembly 110 is regulated by system 100. Second valve 114 of valve assembly 110 may be disposed in serial fluid communication with first valve 112. Each of first valve 112 and second valve 114 may be configured to independently control the airflow output of valve assembly 110. The dual-valve configuration with independently controllable first and second valves 112, 114 of system 100 provides redundant control, including shutoff capability, of the airflow through valve assembly 110.

In various embodiments, valve assembly 110 may be in fluid communication between an input 104 of compressed air and an engine component. Input 104 may comprise a supply of compressed air having an input pressure P1 as an input airflow pressure into valve assembly 110. Valve assembly 110 may be configured to receive compressed air from input 104 and to deliver a controlled pressurized airflow to the engine component, such as an air turbine starter 106. Air turbine starter 106 may be configured to receive the controlled pressurized airflow from valve assembly 110. Air turbine starter 106 may include a turbine wheel and gear shaft, wherein the air turbine starter 106 may be configured to receive compressed air from valve assembly 110 and to drive the turbine wheel and gear shaft, and thereby convert the pneumatic energy from the compressed air into mechanical energy. The gear shaft of air turbine starter 106 may be operatively coupled to gas turbine engine 20 to rotate the gas turbine engine 20 during start-up. Increasing the airflow to air turbine starter 106 may increase the rotational speed of the turbine wheel and gear shaft within air turbine starter 106, and thereby increase the rotational speed of gas turbine engine 20.

System 100 may include a tangible, non-transitory memory configured to communicate with the FADEC 102, the tangible, non-transitory memory having instructions stored thereon that, in response to execution by the FADEC 102, cause FADEC 102 to perform operations for controlling a rotational speed of a gas turbine engine 20. In various embodiments, FADEC 102 may include or communicate with one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof.

System 100 may further include a feedback element, such as a sensor 120, in electrical communication with FADEC 102. In various embodiments, sensor 120 may be coupled to gas turbine engine 20 and/or air turbine starter 106. Sensor 120 may comprise a speed sensor, position sensor, temperature sensor, pressure sensor or other sensing device. Sensor 120 may be configured to measure a characteristic of an engine component or gas turbine engine 20. Sensor 120 may be configured to measure, for example, a rotational speed or angular velocity of gas turbine engine 20 and/or air turbine starter 106. Sensor 120 may be configured to send the rotational speed measurement to FADEC 102, thereby providing data or feedback 122 about gas turbine engine 20 and/or air turbine starter 106 to FADEC 102. Feedback 122 may be for example, a speed signal, or may be position feedback, temperature feedback, pressure feedback or other data.

In various embodiments, FADEC 102 may be configured to receive the measurement from sensor 120 and may be configured to generate a command based on the measurement received from sensor 120. System 100 may provide a closed loop control of the rotational speed of gas turbine engine 20. FADEC 102 receives feedback 122 and commands first valve control device 116 and/or second valve control device 118 to adjust or maintain a position of first valve 112 and/or second valve 114, respectively, based upon continually measured changes in the detected feedback characteristic, such as engine speed. For example, FADEC 102 may determine based on feedback 122, that the position of first valve 112 and/or second valve 114 is not providing the proper air pressure to maintain the desired speed of gas turbine section 20. In response to determining that an engine speed is too low or too high, FADEC 102 may send a command to first valve control device 116 to adjust a position of the first valve 112 and/or FADEC 102 may send a command to second valve control device 118 to adjust a position of the second valve 114 to increase or decrease airflow or air pressure at the output of valve assembly 110.

In various embodiments, first valve 112 and second valve 114 provide redundant control of the airflow output of valve assembly 110. First valve 112 and second valve 114 further provide redundant shutoff capability for valve assembly 110. First valve 112 may be coupled to first valve control device 116, which as discussed, may include a torque motor servovalve. A torque motor servovalve may be referred to herein as a torque motor. First valve control device 116 may comprise a servomotor, solenoid or other system. Second valve 114 may be coupled to second valve control device 118, which as discussed, may include a torque motor servovalve, servomotor, solenoid or other system. Any suitable valve system having a valve and an actuation device for positioning the valve may be used with first valve 112 and second valve 114. For example, the first valve control device 116 coupled to first valve 112 may comprise a first torque motor servovalve, and the second valve control device 118 coupled to second valve 114 may comprise a second torque motor servovalve, such as torque motor servovalve 142 (see FIG. 3A). The first valve control device 116 coupled to first valve 112 may comprise a first solenoid, and the second valve control device 118 coupled to second valve 114 may comprise a second solenoid, such as solenoid 144 (see FIG. 3A). Each of the first valve control device 116 and second valve control device 118 may be in electrical communication with the FADEC 102.

In various embodiments, one of first valve 112 and second valve 114 may be configured as a primary valve, and the other of first valve 112 and second valve 114 may be configured as a secondary valve. The secondary valve may be used in the event the primary valve fails. For example, second valve 114 as a secondary valve may be locked open, while first valve 112 as a primary valve may be modulated by FADEC 102 through first valve control device 116 to control the airflow output or output pressure P2. In the event that first valve 112 fails, first valve 112 may be locked open and second valve 114 may be modulated by FADEC 102 through second valve control device 118 to control the airflow output or output pressure P2. Thus, the airflow output or output pressure P2 may be controlled with either of first valve 112 or second valve 114 and by either of first valve control device 116 or second valve control device 118, thereby providing redundant control of the airflow output or output pressure P2. The output pressure P2 of the airflow delivered to air turbine starter 106 may determine a rotational speed of air turbine starter 106, which controls a rotational speed of gas turbine engine 20. In various embodiments, the output pressure P2 of airflow to air turbine starter 106 is controlled by system 100 to maintain a rotational engine speed between 1 to 4,000 rotations per minute (rpms) during start-up. The control of engine speed by system 100 during startup provides a uniformly distributed engine temperature thereby thermally stabilizing the engine.

System 100 may manage the output pressure P2 of air supplied to an aircraft component by regulating the mass flow of pressurized air through valve assembly 110. Although the present application is, for convenience of explanation, depicted and described as being implemented in an air turbine starter, it should be appreciated that the system 100 can be implemented in other machines or systems. For example, system 100 may be used to regulate the pressure of a bleed air supply in a deicing system.

Figure 3A:
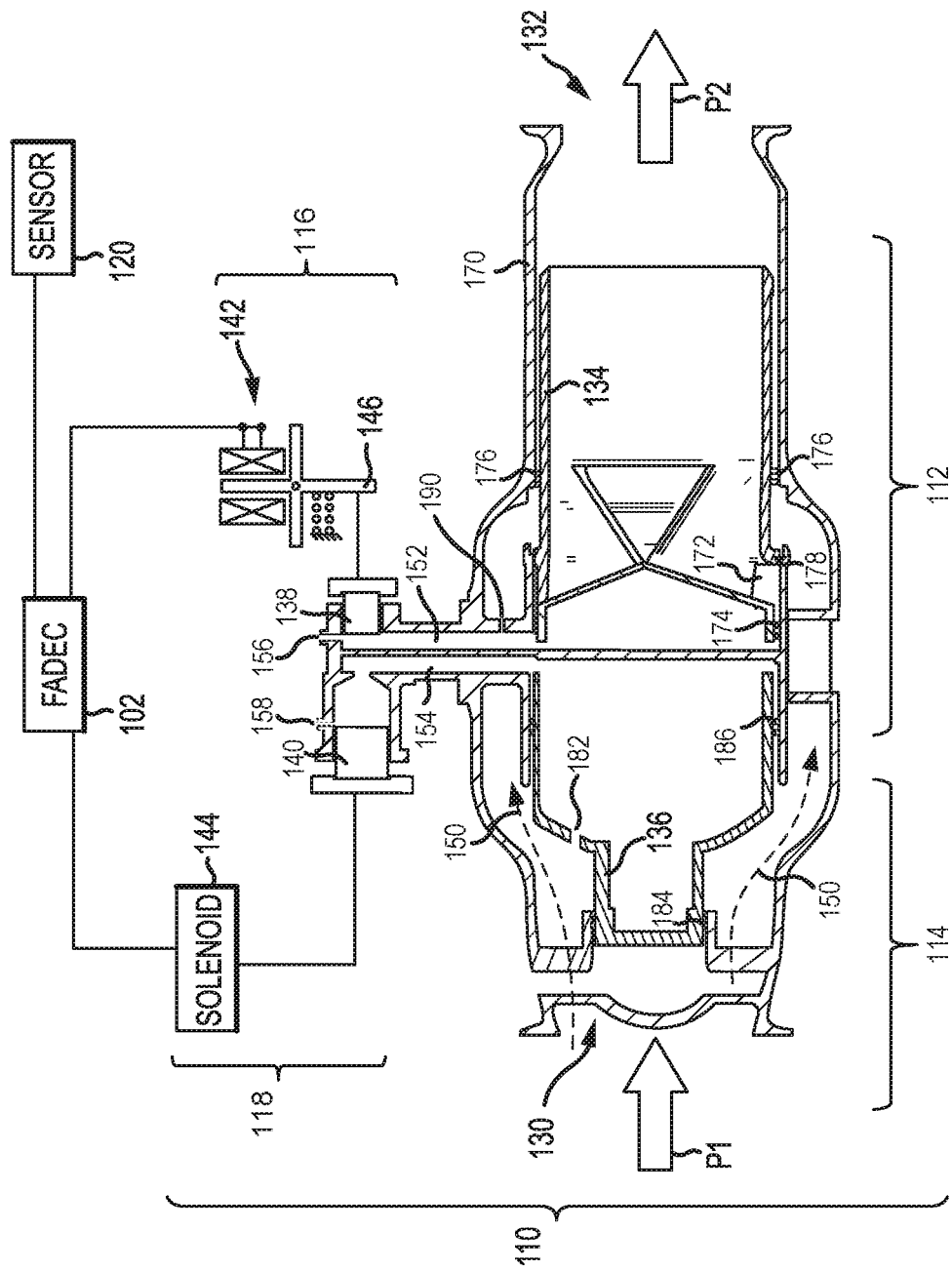
FIGS. 3A, 3B and 3C illustrate a cross-section of valve assembly in various valve positions, in accordance with various embodiments.
Figure 3B:
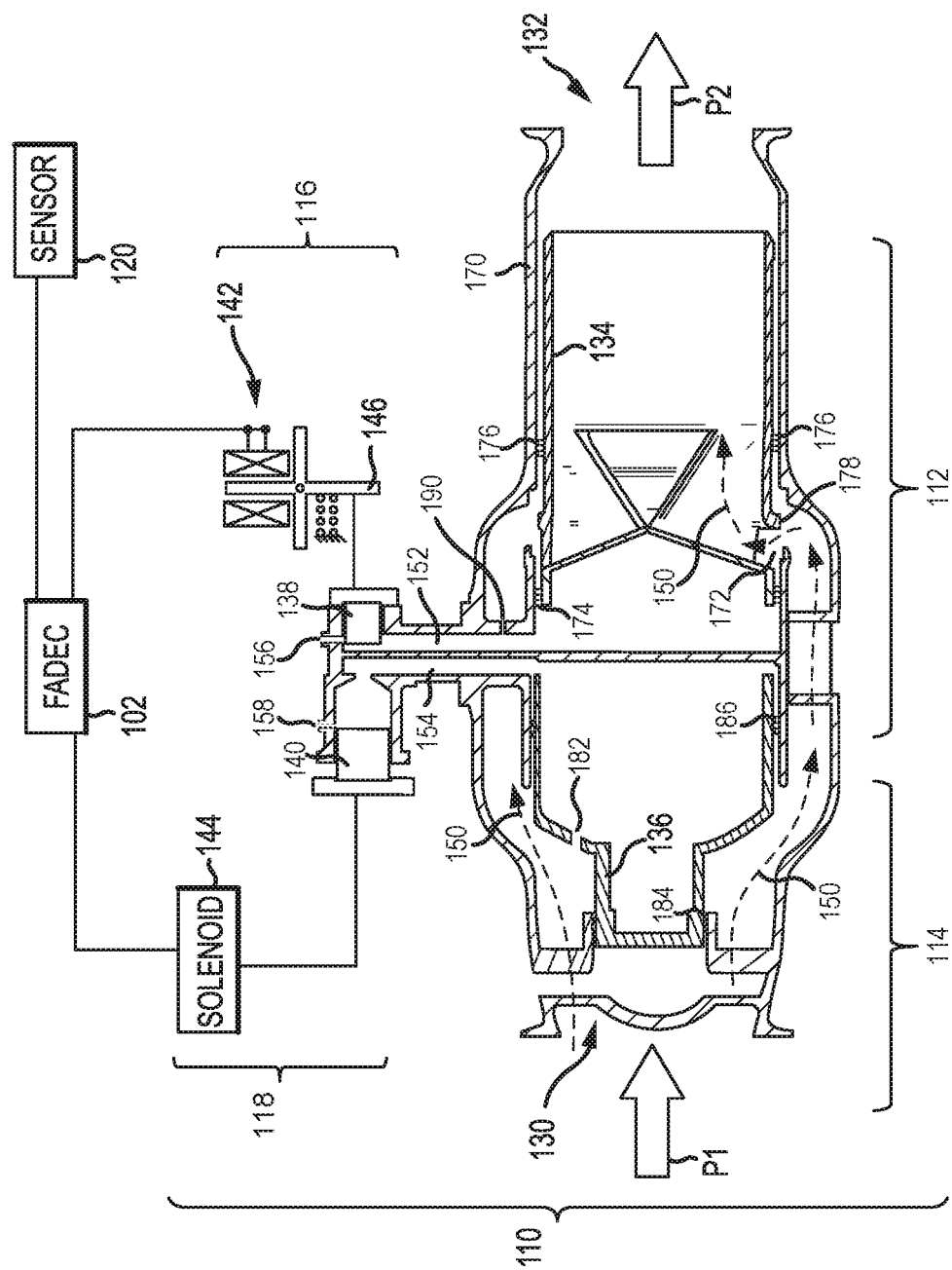
Figure 3C:
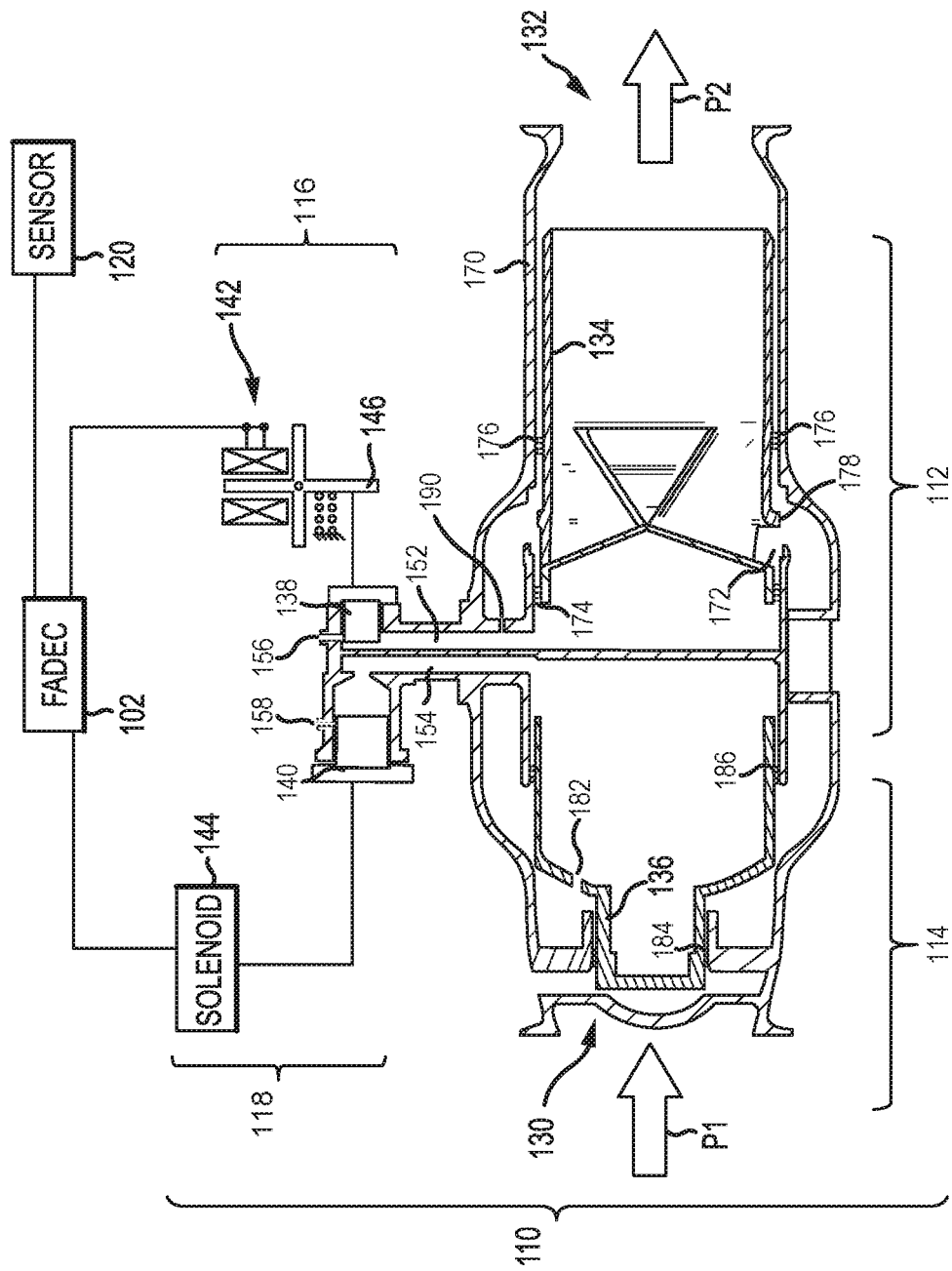

With reference to FIGS. 3A, 3B and 3C, a valve assembly 110 is shown in communication with FADEC 102, in accordance with various embodiments. Valve assembly 110 may include an airflow inlet 130 and an airflow outlet 132 with first valve 112 and second valve 114 disposed therebetween. First valve 112 and second valve 114 may each be configured to regulate the mass flow and/or air pressure at airflow outlet 132. In various embodiments, second valve 114 of valve assembly 110 may be in fluidic series with the first valve 112 and may be positioned upstream or downstream of first valve 112. The second valve 114 might be incorporated into and integrated with the first valve 112. A position of the first valve 112 may be adjusted to an incremental position between fully open and fully closed to control the airflow through valve assembly 110. The second valve 114 may be opened or closed to turn on or off the airflow through valve assembly 110.

In various embodiments, first valve 112 may comprise a first piston 134, and second valve 114 may comprise a second piston 136. First piston 134 and second piston 136 may be disposed within a housing 170. First piston 134 of first valve 112 may define an orifice 172 disposed generally between first seal rings 174 and second seal rings 176, i.e., first seal rings 174 are disposed upstream of orifice 172 and second seal rings 176 are disposed downstream of orifice 172. First piston 134 may comprise a modulating sleeve 178. A position of first piston 134 within housing 170, and more specifically, a position of orifice 172 and modulating sleeve 178 of first piston 134 within housing 170 may determine an airflow through first valve 112. Second piston 136 of second valve 114 may define an orifice 182 disposed generally between first seal rings 184 and second seal rings 186, i.e., first seal rings 184 are disposed upstream of orifice 182 and second seal rings 186 are disposed downstream of orifice 182. A position of second piston 136 within housing 170 may determine an airflow through second valve 114. First piston 134 and second piston 136 may be in serial fluid communication with the airflow inlet 130 and the airflow outlet 132, such that either of first piston 134 of first valve 112 or second piston 136 of second valve 114 may regulate the airflow 150. As discussed above, first valve 112 and second valve 114 may each be controlled by a control mechanism or valve control device 116, 118 for adjusting a fluid pressure acting on the valves 112, 114.

In various embodiments, first valve control device 116 may comprise a first control valve 138. First control valve 138 may be in fluid communication with first valve 112 through a first passage 152 and an inlet orifice 190. First valve control device 116 may control a position of first control valve 138, as discussed herein, regulates a position of first valve 112. First valve control device 116 may regulate the airflow 150 between airflow inlet 130 and airflow outlet 132 by controlling a position of a first piston 134. Second valve control device 118 may comprise a second control valve 140. Second control valve 140 may be in fluid communication with second valve 114 through a second passage 154. Second valve control device 118 may control a position of second control valve 140, as discussed herein, regulates a position of second valve 114. Second valve control device 118 may regulate the airflow 150 between airflow inlet 130 and airflow outlet 132 by controlling a position of a second piston 136.

By example, first valve control device 116 is schematically illustrated in FIGS. 3A, 3B and 3C as a torque motor servovalve 142 configured to control a position of first valve 112. Second valve control device 118 is schematically illustrated as a solenoid 144 configured to control a position of second valve 114.

According to various embodiments, FIG. 3A shows first valve 112 in a closed position and shows second valve 114 in an open position. With second piston 136 in an open position, airflow 150 may flow through second valve 114. With first piston 134 in a closed position, airflow 150 does not flow through first valve 112. Because first valve 112 and second valve 114 are disposed in series, the first valve 112 being in a closed position blocks airflow through valve assembly 110. Airflow 150 is blocked by first piston 134 and an output pressure P2 at airflow outlet 132 may be negligible.

In various embodiments, first valve 112 is controlled by first valve control device 116, which may be a torque motor servovalve 142. Torque motor servovalve 142 may be an electromagnetic device that responds to changes in an input current and that varies a position of an armature 146 in response to the input current. A position of armature 146 of torque motor servovalve 142 may be proportional to the input current, such that the position of armature 146 may be selected between fully open and fully closed as well as incremental positions between fully open and fully closed. Armature 146 may be coupled to first control valve 138 such that a position of first control valve 138 changes as the position of armature 146 changes. Torque motor servovalve 142 may be configured to receive a command signal from FADEC 102 to vary a position of armature 146 and thus a position of first control valve 138. Thus, the input of current into torque motor servovalve 142 may control (i.e. open, close, modulate and/or vary) a position of first control valve 138. A position of armature 146, and thus a position of first control valve 138 may control a position of first piston 134.

In various embodiments, first control valve 138 of first valve control device 116 may be configured to partially and/or completely open and close a first vent 156. A position of first control valve 138 controls a position of first piston 134 by controlling an air pressure within first passage 152.

In various embodiments, valve assembly 110 may be configured to close first valve 112 by either opening or closing first vent 156, depending on the configuration of the first valve control device 116 and first valve 112. FIG. 3A illustrates, by example, valve assembly 110 configured to close first valve 112 by opening first vent 156. Opening first vent 156 causes pressure to decrease within first passage 152 and first piston 134 to move to a closed position. Thus, as torque motor servovalve 142 moves first control valve 138 toward an open position, first piston 134 moves proportionally to decrease airflow through first valve 112 of valve assembly 110, thereby decreasing the output pressure P2 of air at airflow outlet 132.

According to various embodiments, FIG. 3B shows first valve 112 and second valve 114 in open positions. With first piston 134 and second piston 136 in open positions, airflow 150 flows through both first valve 112 and second valve 114. First control valve 138 may close a first vent 156 resulting in an increase in pressure within first passage 152. The pressure increase within first passage 152 moves first piston 134 into an open position. As torque motor servovalve 142 moves first control valve 138 towards a close position, first piston 134 moves or opens proportionally to increase airflow through first valve 112 of valve assembly 110, thereby increasing the output pressure P2 of air at airflow outlet 132.

According to various embodiments, FIG. 3C shows first valve 112 in an open position and shows second valve 114 in a closed position. With first piston 134 in an open position, airflow 150 may flow through first valve 112. With second piston 136 in a closed position, airflow 150 does not flow through second valve 114. Because first valve 112 and second valve 114 are disposed in series, the second valve 114 being in a closed position blocks airflow through valve assembly 110. Airflow 150 is blocked by second piston 136 and an output pressure P2 at airflow outlet 132 may be negligible.

In various embodiments, second valve 114 is controlled by second valve control device 118, which may be a solenoid 144. Solenoid 144 may be configured to receive a command signal from FADEC 102 to control a second control valve 140. Second control valve 140 may comprise a solenoid-operated shut off valve. A position of second control valve 140 may determine a position of second piston 136. In various embodiments, valve assembly 110 may be configured to close second valve 114 by either opening or closing second vent 158, depending on the configuration of the second valve control device 118 and second valve 114. FIG. 3C illustrates, by example, valve assembly 110 configured to close second valve 114 by closing second vent 158. Solenoid 144 may be configured to toggle second control valve 140 between an open position (see FIGS. 3A and 3B), which opens second valve 114, and a closed position (see FIG. 3C), which closes second valve 114. For example, solenoid 144 may close second control valve 140, closing second vent 158, in order to move second piston 136 to a completely closed position (see FIG. 3C). Closing second vent 158 may cause a pressure to increase within second passage 154 and second piston 136 to move to a closed position. Second piston 136 moves to the fully closed position to prevent airflow 150 through second valve 114 of valve assembly 110. With airflow 150 blocked by second piston 136, an output pressure P2 at airflow outlet 132 is low.

Referring again to FIGS. 3A and 3B, solenoid 144 may be configured to toggle second control valve 140 to an open position. Second control valve 140 may open second vent 158 resulting in a decrease in pressure within second passage 154. The reduced pressure within second passage 154 may cause second piston 136 to move to the open position (see FIGS. 3A and 3B). Second piston 136 moves to the fully open position to allow airflow through second valve 114 of valve assembly 110.

Referring to FIGS. 2, 3A, 3B and 3C, solenoid 144 operates to modulate second piston 136 between open and closed, or "on" and "off." Solenoid 144 may be turned on and off by FADEC 102 in pulses for achieving a pulse width modulation control of the airflow through second valve 114. By regulating a ratio of the "on" time versus the "off" time, the overall airflow rate through second valve 114 over time can be adjusted. The "on" pulses may be relatively longer to supply more airflow and to increase the output pressure P2 of air at airflow outlet 132. The "on" pulses may be relatively shorter to reduce airflow through second valve 114 of valve assembly 110 and to reduce an output pressure P2 of air at airflow outlet 132.

FADEC 102 may implement the pulse width modulated control of second valve 114 when the first valve 112 has been locked open. For example, when the first valve 112 has failed, first valve 112 may be automatically or manually locked in an open position. In such a condition, FADEC 102 may implement pulse width modulation control of second valve 114 to regulate airflow through valve assembly 110. The pulse width may also be controlled by FADEC 102 based on feedback 122 (see FIG. 2), such as engine speed, engine temperature or air pressure.

Figure 4:
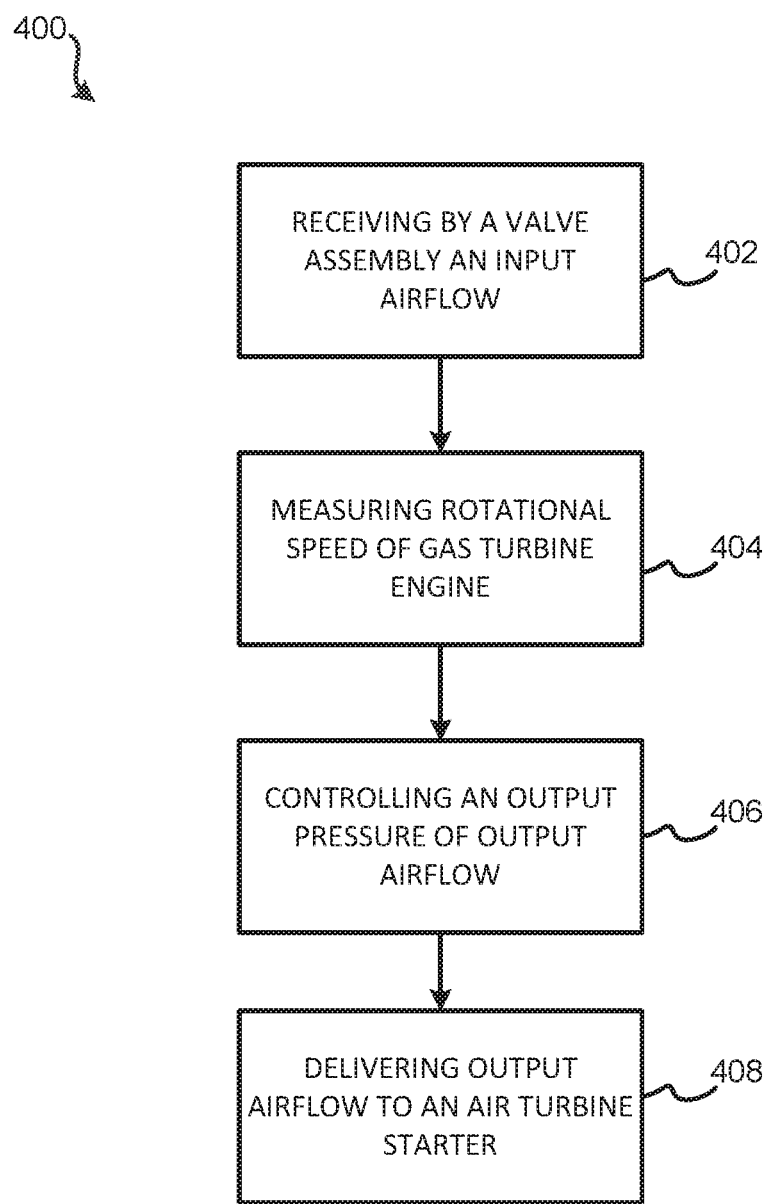
FIG. 4 illustrates a method for controlling a speed of a gas turbine engine during a start-up cycle, in accordance with various embodiments.

With reference to FIG. 4, a method 400 for controlling an engine speed at start-up is shown, in accordance with various embodiments. A controller capable of carrying out the steps of method 400 in FIG. 4 may be a FADEC 102. Method 400 may comprise the step of receiving by a valve assembly an input airflow (step 402). The valve assembly may include a first valve 112 and a second valve 114. Method 400 may comprise the steps of measuring the rotational speed of the gas turbine engine (step 404), controlling an output pressure of the output airflow (step 406), and delivering an output airflow to an air turbine starter coupled to the gas turbine engine (step 408). The air turbine starter 106 may be coupled to the gas turbine engine 20.

Step 402 may further comprise receiving by valve assembly 110 an input airflow having an input pressure P1. Step 404 may further comprise measuring the rotational speed of the gas turbine engine 20 during start-up. Step 406 may further comprise controlling, by FADEC 102, an output pressure P2 of the output airflow by positioning or by controlling a position of at least one of the first valve 112 and the second valve 114 based on the rotational speed of the gas turbine engine. A first valve control device 116 may be coupled to the first valve 112, and a second valve control device 118 may be coupled to the second valve 114. The first valve control device 116 may comprise a torque motor servovalve 142. Step 406 may further comprise delivering a current to the torque motor servovalve 142 to adjust or maintain a position of the first valve 112. Step 406 may further comprise increasing or decreasing current supplied to a torque motor servovalve 142 based on the rotational speed of the gas turbine engine. The second valve control device 118 may comprise a solenoid 144. Step 406 may further comprise energizing or de-energizing solenoid 144 to position second valve 114 to fully open position or fully closed position. Step 406 may further comprise pulse width modulating the solenoid 144 between an on state and an off state based on the rotational speed of the gas turbine engine. Modulating the solenoid 144 between the on and off states may control airflow through second valve 114 and the output pressure P2 at the airflow outlet 132. Step 406 may further comprise decreasing the output pressure P2 of the output airflow to reduce the rotational speed of the gas turbine engine 20 and/or increasing the output pressure P2 of the output airflow to increase the rotational speed of the gas turbine engine 20.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of controlling a rotational speed of a gas turbine engine during start-up, comprising: receiving, by a valve assembly, an input airflow having an input pressure, the valve assembly including a first valve and a second valve, the second valve in fluidic series with the first valve;
measuring the rotational speed of the gas turbine engine;
determining, by a full authority digital engine control (FADEC), an engine speed adjustment based on the rotational speed, a second position of at least one of the first valve or the second valve, and a desired speed;

controlling, by the FADEC, an output pressure of an output airflow by controlling a position at least one of the first valve and the second valve based on the engine speed adjustment and the desired speed, and in response, controlling the output pressure at an airflow outlet of the valve assembly to maintain the rotational speed at the desired speed;

determining, by the FADEC, a valve condition, the valve condition corresponding to a failure of the first valve;

pulse width modulating, by the FADEC, a solenoid of the second valve in response to the valve condition to regulate an airflow through the valve assembly; and delivering the output airflow to an air turbine starter coupled to the gas turbine engine.

2. The method of claim 1, wherein the first valve comprises a torque motor servovalve and wherein the positioning the at least one of the first valve and the second valve further comprises delivering a current to the torque motor servovalve to adjust the position of the first valve.

3. The method of claim 2, wherein the positioning the at least one of the first valve and the second valve further comprises locking the second valve in an open position while adjusting the position of the first valve.

4. The method of claim 1 wherein the positioning the at least one of the first valve and the second valve further comprises pulse width modulating the solenoid between an on state and an off state.

5. The method of claim 4, wherein the positioning the at least one of the first valve and the second valve further comprises locking the first valve in an open position while pulse width modulating the solenoid.

6. The method of claim 1, further comprising decreasing the output pressure of the output airflow to reduce the rotational speed of the gas turbine engine.

7. A system for a gas turbine engine, comprising: an air turbine starter operatively coupled to the gas turbine engine and configured to rotate the gas turbine engine during a startup condition;

a valve assembly having an airflow outlet in fluid communication with the air turbine starter, the valve assembly including:

a first valve, a first valve control device coupled to the first valve and configured to control the first valve, and wherein the first valve control device is configured to control a pressure at the airflow outlet of the valve assembly;

a second valve in fluidic series with the first valve, a second valve control device coupled to the second valve and configured to control the second valve, the second valve control device comprising a solenoid;

a full authority digital engine control (FADEC) coupled to the valve assembly;

a sensor configured to measure a rotational speed of the gas turbine engine; and a tangible, non-transitory memory configured to communicate with the FADEC, the tangible, non-transitory memory having instructions stored thereon that, in response to execution by the FADEC, cause the FADEC to perform operations comprising:

receiving, by the FADEC, a rotational speed measurement from the sensor;

determining, by the FADEC, an engine speed adjustment based on the rotational speed measurement, a second position of at least one of the first valve or the second valve, and a desired speed;

generating, by the FADEC, a command for at least one of the first valve control device or the second valve control device based on the engine speed adjustment and the desired speed;

sending, by the FADEC, the command to at least one of the first valve control device or the second valve control device and, in response, controlling the pressure at the airflow outlet of the valve assembly to maintain the rotational speed measurement at the desired speed;

determining, by the FADEC, a valve condition, the valve condition corresponding to a failure of the first valve; and pulse width modulating, by the FADEC, the solenoid of the second valve control device in response to the valve condition to regulate an airflow through the valve assembly.

8. The system of claim 7, wherein the first valve control device comprises a torque motor servovalve.

9. The system of claim 8, wherein the torque motor servovalve is configured to receive the command from the FADEC and to position the first valve.

10. The system of claim 9, wherein the solenoid is configured to receive the command from the FADEC and to open or close the second valve.

11. The system of claim 7, wherein the second valve comprises a second piston, and wherein a third position of the second piston is configured to control the pressure at the airflow outlet of the valve assembly.

12. The system of claim 7, wherein the first valve control device and the second valve control device are in electrical communication with the FADEC, and wherein the first valve control device comprises a first torque motor servovalve and the second valve control device comprises a second torque motor servovalve.

13. The system of claim 7, further comprising a means of positioning the first valve control device.

14. The system of claim 7, further comprising a means of opening or closing the first valve control device.

\* \* \* \* \*